(No Model.)

A. D. & C. M. ATWOOD.
CAR COUPLING.

No. 284,797. Patented Sept. 11, 1883.

WITNESSES:
J. D. Garfield
C. Sedgwick

INVENTOR:
A. D. Atwood
C. M. Atwood
BY Munn & Co.
ATTORNEYS.

UNITED STATES PATENT OFFICE.

ADISON D. ATWOOD AND CHARLIE M. ATWOOD, OF EAST PORTLAND, OREG.

CAR-COUPLING.

SPECIFICATION forming part of Letters Patent No. 284,797, dated September 11, 1883.

Application filed May 11, 1883. (No model.)

*To all whom it may concern:*

Be it known that we, ADISON D. ATWOOD and CHARLIE M. ATWOOD, of East Portland, in the county of Multnomah and State of Oregon, have invented a new and Improved Self-Coupler, of which the following is a full, clear, and exact description.

The object of the invention is to improve automatic car-couplers, as hereinafter described, and pointed out in the claims.

Reference is to be had to the accompanying drawings, forming part of this specification, in which similar letters of reference indicate corresponding parts in both the figures.

Figure 1:
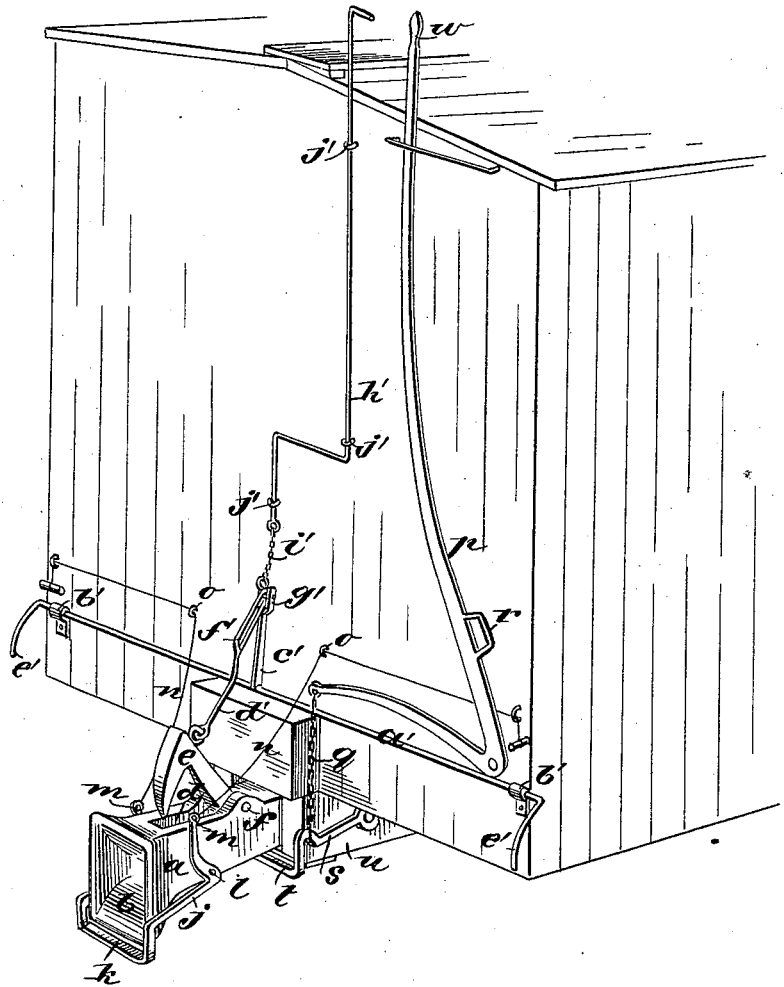
Figure 2:
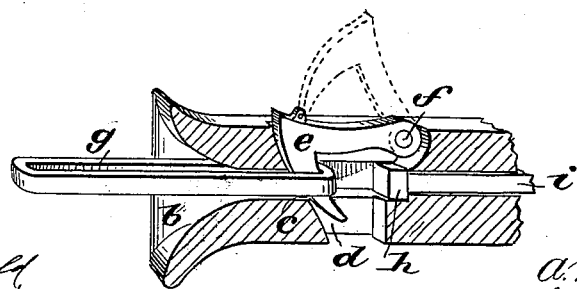

Figure 1 is a perspective view of a box-car with our improved coupling applied to it, and Fig. 2 is a sectional elevation of the draw-bar along its longitudinal center.

We make the draw-bar $a$ with a widely-flaring mouth, $b$, to the link-socket $c$, through which we make a vertical opening, $d$, and fit the coupling-hook $e$ in said opening, on a pivot, $f$, so that the hook will be easily raised by the end of the link $g$ when pressed in against the curved front end of the hook, and will be self-coupling by falling back through the link. The head $h$ of the draw-rod $i$, to which the draw-bar $a$ is connected, is located a suitable distance back of the hook to allow the link to enter far enough to insure certainty of coupling, and at the same time to prevent it from entering too far. It will be seen that links $g$ widely divergent from the line of the link-socket will be surely guided thereto, and that the coupling will be effected with certainty and without danger to attendants. For a link-lifter to raise the link up level or above the line of the socket in order to guide it into the draw-bar of the opposite car to couple with cars of different heights, we propose to use the double-elbow lever $j$ and connecting-bar $k$, pivoted to the sides of the draw-bar at $l$, so that the bar $k$ ranges along the front of the draw-bar under the link, while the arms $m$ rise above the pivots $l$ and have pull-cords $n$ extending therefrom, through suitable guides, $o$, to the sides of the car, where the link can be raised for coupling at any time by pulling one of the cords. We also propose to have an elevator for raising the draw-bar for the same purpose, to be operated either from the side or top of the car, consisting of the elbow-lever $p$, chain $q$, and the double lever $s$, with a connecting-bar, $t$, ranging under the draw-bar in front of the box $u$, to which said lever is pivoted. The lever $p$ has a handle, $r$, adapted to be used by a person standing on the ground, and it also has a handle, $w$, extending above the top of the car, for working the elevator therefrom.

To uncouple from the sides of the car, we have a crank-shaft, $a'$, extending across the front end of the car in suitable bearings, and connected to the hook $e$ by the arm $c'$ and the link $d'$, the said shaft having a crank or arm, $e'$, at each end for turning it; and to lift the hook from the top of the car, and without turning the crank-shaft $a'$, we make a long slot, $f'$, in the link $d'$ for the pin $g'$, connecting said link with arm $c'$, allowing the link $d'$ to rise on said pin and connect the pull-rod $h'$ and chain $i'$ with the said link $d'$, the rod being fitted in guides $j'$, for keeping it in place and allowing it to slide. The slot $f'$ in the link $d'$ also allows for the requisite play of the spring on the draw-rod without interfering with the coupling-hook.

Having thus fully described our invention, we claim as new and desire to secure by Letters Patent—

1. The combination of the hook $e$, having an eye on top, the link $d'$, slotted at $f'$, the pin $g'$, and the arm $c'$ on crank-shaft $a'$, with the chain $i'$ and the pull-rod $h'$, as shown and described.

2. The combination, with the draw-bar $a$, of a link-lifter consisting of double lever $j$, connecting-bar $k$, and the pull-cords $n$, substantially as described.

3. The combination, with the draw-bar $a$, of the elevator consisting of the double lever $s$ and connecting-bar $t$, and the elbow-lever $p$, said lever being arranged to be actuated from the side or top of the car, substantially as described.

ADISON D. ATWOOD.
CHARLIE M. ATWOOD.

Witnesses:
J. M. SLIKER,
PAUL STANLEY.